C. WACHTER.
SHEARS FOR CUTTING METAL.
APPLICATION FILED SEPT. 23, 1908.
983,585.
Patented Feb. 7, 1911.
3 SHEETS—SHEET 1.
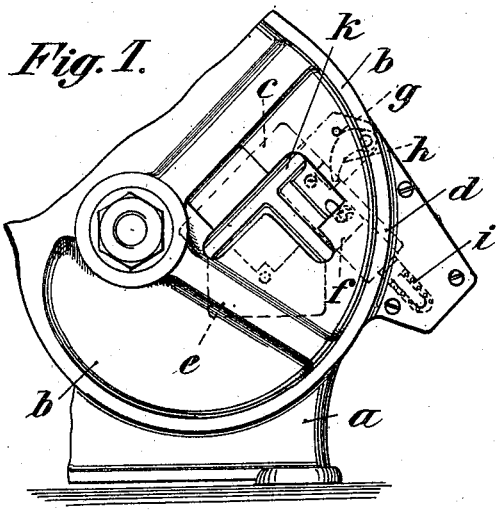
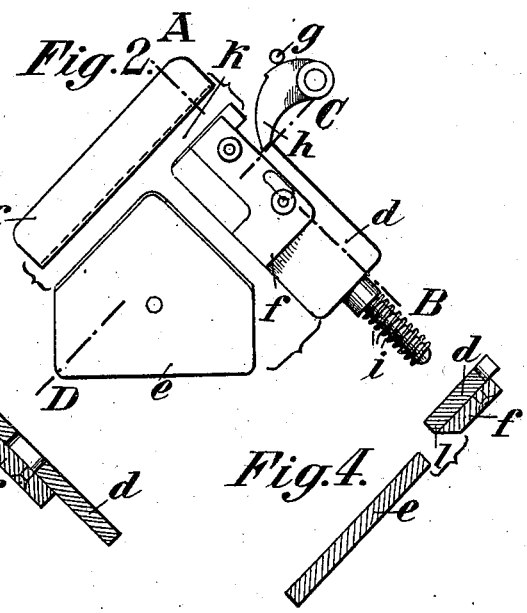
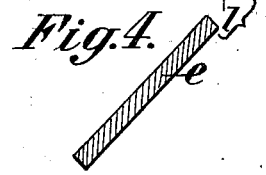
Witnesses:
Wilhelm Ruppert
Georg Otto
Inventor:
Carl Wachter
by: Williams & Craky
Attorney.
THE NORRIS PETERS CO., WASHINGTON, D. C.

C. WACHTER.
SHEARS FOR CUTTING METAL.
APPLICATION FILED SEPT. 23, 1908.
983,585.
Patented Feb. 7, 1911.
3 SHEETS—SHEET 2.
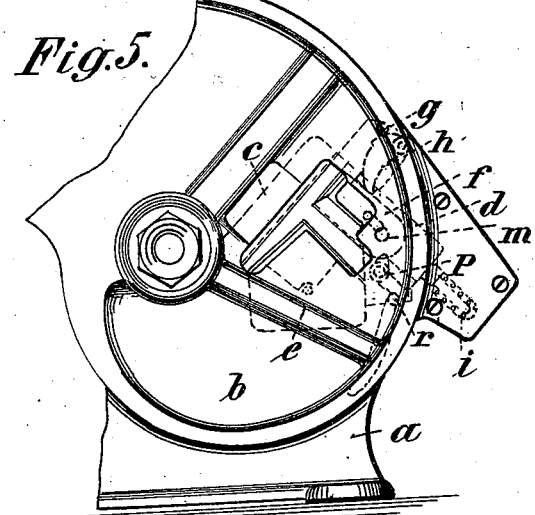
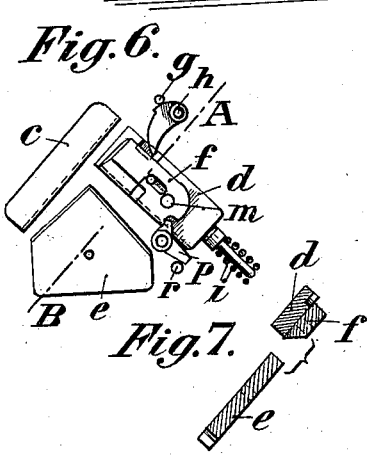
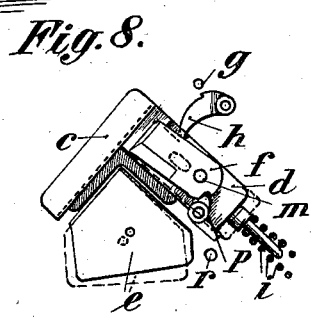
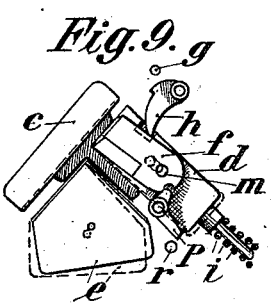
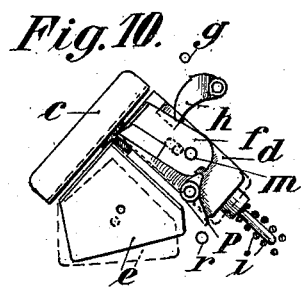
Witnesses:
Wilhelm Ruppert
Georg Otto
Inventor:
Carl Wachter
by: Williams & Clark
Attorney.

C. WACHTER.
SHEARS FOR CUTTING METAL.
APPLICATION FILED SEPT. 23, 1908.
983,585.
Patented Feb. 7, 1911.
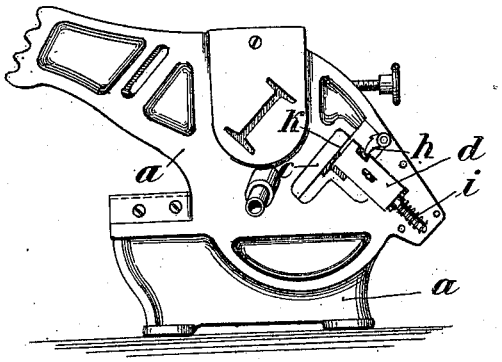
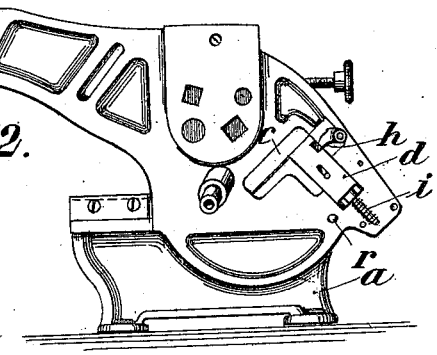
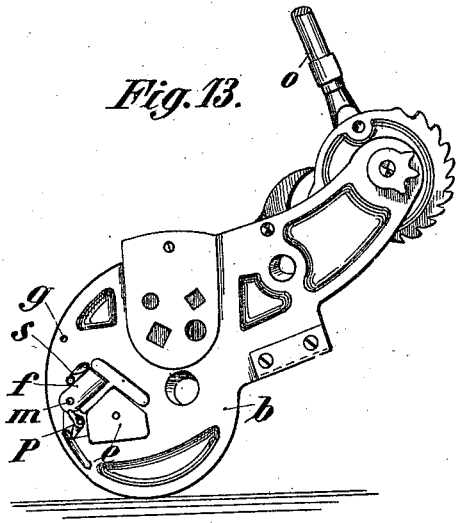

UNITED STATES PATENT OFFICE.

CARL WACHTER, OF WEINGARTEN, GERMANY.

SHEARS FOR CUTTING METAL.

983,585.  Specification of Letters Patent.  Patented Feb. 7, 1911.

Application filed September 23, 1908. Serial No. 454,316.

*To all whom it may concern:*

Be it known that I, CARL WACHTER, managing director, citizen of Germany, subject of the King of Würtemberg, residing at Weingarten, in the Kingdom of Würtemberg and Empire of Germany, have invented certain new and useful Improvements in Shears for Cutting Metal, of which the following is a full, clear, and exact description.

This invention has for its object a new arrangement of the blades in shears for cutting figured iron, the essential feature of which is that one group of blades is closed automatically at the beginning of the cutting movement, as far as the profile to be cut off requires it, and opens again at the return-movement of the blade-holder, so that the blades are automatically adjusted according to the different thicknesses of profiles to be cut. In addition to this movement of the blades one of the blades, arranged in the rotary blade-holder, is mounted to have an independent pivotal movement.

A further feature of the present figured iron shears is that by the special arrangement of the blades it is possible to make right and left miter cuts on angle-irons. In consequence of the above mentioned movement of the blades, they press closely on the profile to be cut, and thereby there is attained the cleanest and most accurate cut when cutting figured iron of different thicknesses.

The accompanying drawing illustrates the invention in two sample forms of construction.

Figure 1 is a front view of figured iron shears with a blade which automatically adjusts itself according to the profile to be cut. Fig. 2 shows the blades in the same position as in Fig. 1, only on an enlarged scale. Fig. 3 is a section through the blades on the line A—B. Fig. 4 a section through the blades on the line C—D. Fig. 5 shows similar figured iron shears as Fig. 1, in which moreover one of the blades journaled in the rotary blade-holder is arranged in a manner that it adjusts itself automatically. Fig. 6 shows the arrangement of the blades according to Fig. 5, but separately. Fig. 7 is a section through Fig. 6 on the line A—B. Fig. 8 shows the blades in their position ready for cutting an angle-iron. Fig. 9 shows the blades in their position ready for cutting a strong T-iron. Fig. 10 shows the blades in their position ready for cutting a thin T-iron. Fig. 11 is a top-view of the stationary blade-holder according to Fig. 1 with the rotary blade-holder removed and a thin T-iron put in to be cut. Fig. 12 is a top-view of the stationary blade-holder with the blades inserted and the rotary blade-holder removed, the blades ready for cutting angle-irons. Fig. 13 is an inside view of the rotary blade-holder with the blades inserted and the stationary blade-holder removed.

The figured iron shears consist in the form of construction shown in Figs. 1–4 and 11 of a stationary and a rotary blade-holder or carrier $a$ and $b$. In the stationary blade-holder $a$ are arranged the blades $c$ and $d$, in the rotary blade-holder $b$ the blades $e$ and $f$. There is moreover arranged in the rotary blade-holder a bolt or projection $g$, which sets against a cam $h$ turnably arranged in the stationary blade-holder, when the said cam is in the position shown in Figs. 1 and 2.

When the cutting commences, the bolt or projection $g$ in the rotary blade-holder moves in the cutting direction and the cam $h$ in the stationary part $a$, which was till now retained by the bolt, is released, and a spiral spring $i$, likewise arranged in the stationary part $a$, advances the blade $d$ according to the profile to be cut in a manner that the same closely sets against the profile to be cut. When cutting angle-irons the blade $d$ is on the contrary fully advanced, so that it firmly sets against the upper blade $c$, and the gap $k$ is perfectly closed.

When the cutting has taken place, the bolt or projection $g$ presses on the cam $h$, in consequence of the retrograde rotating movement imparted to it by the rotary blade-holder $b$, which cam, in its turn, effects the return of the blade $d$ into the open position.

In the form of construction of the shears according to Figs. 5–10 and Fig. 13, the actuating, that is to say the forward and backward movement of the blade $d$ is effected, exactly as above described, by means of the cam $h$ the bolt $g$ and the spring $i$. Also the blade $e$ in the rotary blade-holder $b$ shows the same arrangement as the corresponding blade $e$ in Figs. 1–4; besides this the blade $f$ is so arranged that it can turn in two ways. This blade $f$ in addition to executing the general circular movement in consequence of its being arranged in the rotary blade-holder $b$, turns on its own axis.

To this end the blade is fastened by means of a bolt $m$ to the rotary blade-holder $b$. It is pressed down at the beginning of the cutting by its own weight, or by other suitable means, with its point upon the profile to be cut in a manner that the point of the blade enters accurately into the angles of the figured iron, as illustrated in Figs. 9 and 10.

On the blade-holder $b$ being turned backward the blade $f$ is by a check-motion moved back into its open position, Figs. 5 and 6. For this purpose there is arranged in the stationary blade-holder $a$ a bolt $r$, which, on the rotary blade-holder being turned, strikes a pawl $p$ provided in the same, which has the form of a double lever, which is thereby caused to engage with the blade $f$ and effects the return-movement of the same.

The blade can, as already mentioned, be put into a rotary movement by its own weight, because the pivot is pressed out of the middle. But, in order to obtain an accurate and reliable working of the blade, the rotary movement of the same can be supported by suitable means for pressing the same down, by draw-springs or pressure springs, buffers or the like. In Fig. 13 this is, for instance, done by a tension spring $s$.

The blades of the figured iron shears have a cutting-direction which forms an angle of 45° with the legs or sides of the angle-iron to be cut, the blade $f$ is slightly beveled at the edge $l$. By the described peculiar movement of the blades, and further owing to their having a cutting direction of 45°, it is possible to cut angle irons in right and left bevels or miters of 45°, the angle-piece to be cut off being in a suitable manner introduced between the blades. In order to bevel angle-irons there is closed, in the first place, as already described, the gap $k$ by pressing the blade $d$ close against the upper blade $c$. The upper blade $c$, the movable blade $d$, and the lower blade $e$ form then an angle, between which the angle iron is introduced and cut off by the movement of the blades (Fig. 8).

The pawls and springs actuating the blades may, of course, be of a different construction without interfering with the essential feature of the invention.

What I claim is:

1. An improvement in metal cutting shears comprising a stationary blade holder, a stationary blade carried thereby, a movable blade also carried by said holder, a rotatable blade holder provided with a blade coöperating with the blades of said stationary blade holder, and a cam operated by the rotatable holder for controlling said movable blade.

2. An improvement in metal cutting shears comprising a stationary blade holder, a stationary blade carried thereby, a spring pressed blade carrier mounted in said holder and provided with a blade, a rotatable blade holder provided with a blade coöperating with the blades of the stationary blade holder, and a cam operated by said rotatable holder for holding said spring pressed blade carrier normally retracted in opposition to the spring pressure.

3. An improvement in metal cutting shears comprising a stationary blade holder, a stationary blade carried thereby, a spring pressed blade carrier mounted in said holder and provided with a blade, a rotatable blade holder provided with a blade coöperating with the blades of the stationary blade holder, a cam for retracting said spring pressed blade carrier in opposition to the spring pressure, and a projection carried by said rotatable holder for operating said cam.

4. An improvement in metal cutting shears comprising a stationary blade holder, a stationary blade carried thereby, a movable blade also carried by said stationary holder and substantially at right angles with said stationary blade, a rotatable blade holder provided with an approximately V-shaped blade coöperating with the blades of said stationary holder, and a cam carried by the rotatable holder for controlling the movable blade holder.

5. An improvement in metal cutting shears comprising a stationary blade holder, a stationary blade carried thereby, a spring pressed carrier also mounted in said holder, a blade pivotally mounted in said carrier, a rotatable blade holder provided with a blade coöperating with the blades of the stationary holder, and a cam operated by the rotatable holder for controlling said spring pressed carrier.

6. An improvement in metal cutting shears comprising a stationary blade holder, a stationary blade carried thereby, a spring pressed carrier also mounted in said holder, a blade pivotally mounted in said carrier, a rotatable blade holder provided with a blade coöperating with the blades of the stationary holder, a cam operated by the rotatable holder for controlling said spring pressed carrier, and means for positively swinging said pivoted blade as its carrier is withdrawn.

7. An improvement in metal cutting shears comprising a stationary blade holder, a stationary blade carried thereby, a spring pressed carrier also mounted in said holder, a blade pivotally mounted in said carrier, a rotatable blade holder provided with a blade coöperating with the blades of the stationary holder, a cam operated by the rotatable holder for controlling said spring pressed carrier, a pawl carried by the rotatable holder for swinging said pivoted blade, and means for operating said pawl.

8. An improvement in metal cutting shears comprising a stationary blade holder, a stationary blade carried thereby, a spring pressed carrier also mounted in said holder, a blade pivotally mounted in said carrier, a rotatable blade holder provided with a blade coöperating with the blades of the stationary holder, a cam operated by the rotatable holder for controlling said spring pressed carrier, a spring acting to normally depress said pivoted blade, and means for positively swinging said pivoted blade as its carrier is withdrawn.

9. An improvement in metal cutting shears comprising a stationary blade holder, a stationary blade carried thereby, a spring pressed carrier also mounted in said holder, a blade pivotally mounted in said carrier, a rotatable blade holder provided with a blade coöperating with the blades of the stationary holder, a cam for retracting said spring pressed blade in opposition to the spring pressure, means carried by said rotatable holder for operating said cam, and means for positively swinging said pivoted blade.

10. An improvement in metal cutting shears comprising a stationary blade holder, a stationary blade carried thereby, a spring pressed carrier also mounted in said holder, a blade pivotally mounted in said carrier, a rotatable blade holder provided with a blade coöperating with the blades of the stationary holder, a cam for retracting said spring pressed blade in opposition to the spring pressure, means carried by said rotatable holder for operating said cam, a pawl carried by said rotatable holder for swinging said pivoted blade, and means for operating said pawl.

In witness whereof, I subscribe my signature, in presence of two witnesses.

CARL WACHTER.

Witnesses:
EDUARD DIERLAMM,
CARL KÖRBER.